Figure 7:
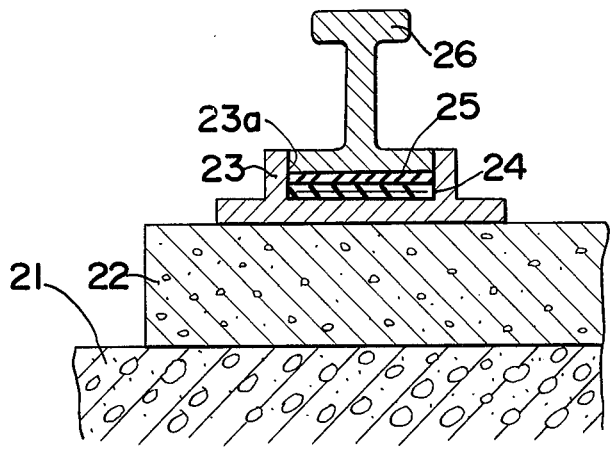

United States Patent [19]

Furuishi et al.

[11] 3,936,661
[45] Feb. 3, 1976

[54] ELECTROTHERMALLY DEFORMABLE LEVELLING PAD

[75] Inventors: Haruhisa Furuishi, Suita; Yoshihiro Murata, Katano; Hidenori Suzaki, Hirakata; Misao Sumoto; Hiroshi Imanaka, both of Otsu, all of Japan

[73] Assignees: Matsushita Electric Industrial Co., Ltd.; Toyo Boseki Kabushiki Kaisha, both of Japan

[22] Filed: Oct. 1, 1974

[21] Appl. No.: 511,472

[30] Foreign Application Priority Data
Oct. 1, 1973 Japan.............................. 48-110852

[52] U.S. Cl. ................ 219/528; 219/213; 219/549; 238/283; 260/860
[51] Int. Cl.² ........................................... H05B 3/34
[58] Field of Search............ 219/213, 523, 528, 529, 219/536, 543, 549, 548; 238/281, 283, 349; 260/860 PE, 823

[56] References Cited
UNITED STATES PATENTS

| 2,185,692 | 1/1940 | McCleary | 219/528 X |
| 2,735,926 | 2/1956 | Langlois | 219/528 |
| 2,741,692 | 4/1956 | Luke | 219/528 |
| 2,938,992 | 5/1960 | Crump | 219/528 |
| 3,584,198 | 6/1971 | Doi et al. | 219/549 |
| 3,662,951 | 5/1972 | Smith et al. | 238/281 |
| 3,682,846 | 8/1972 | Sano et al. | 260/860 X |
| 3,688,984 | 9/1972 | Sonneville | 238/349 |
| 3,745,302 | 7/1973 | Bond | 219/213 |
| 3,766,146 | 10/1973 | Witsiepe | 260/860 X |
| 3,784,520 | 1/1974 | Hoeschele | 260/860 |

Primary Examiner—Volodymyr Y. Mayewsky
Attorney, Agent, or Firm—Wenderoth, Lind & Ponack

[57] ABSTRACT

An electrothermally deformable levelling pad utilizable in padding, levelling or aligning girders, rails or any other constructional or structural elements. The levelling pad comprises at least one thermoplastic plate member and an electric heater for heating the thermoplastic plate member to soften or melt to cause the overall thickness of the pad to reduce to a value sufficient to bring an article or machine to a predetermined level. The plate member is made of a thermoplastic random-copolymerized polyester which comprises an acid component and a glycol component.

6 Claims, 9 Drawing Figures

U.S. Patent   February 3, 1976   Sheet 1 of 2   3,936,661
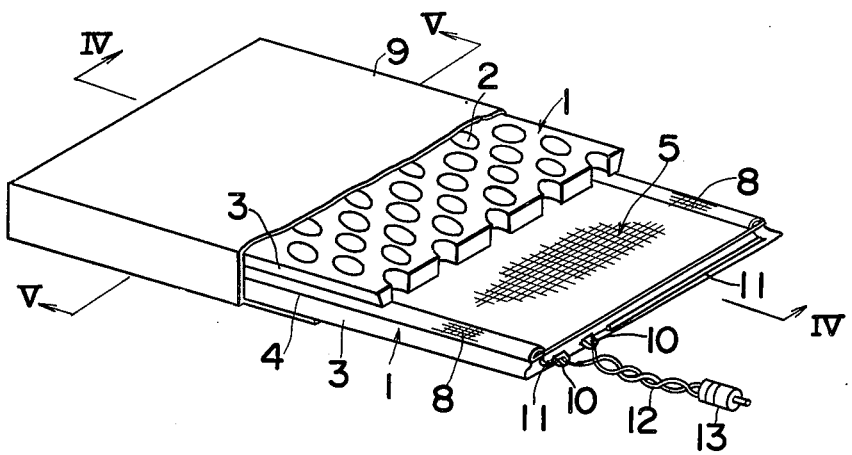
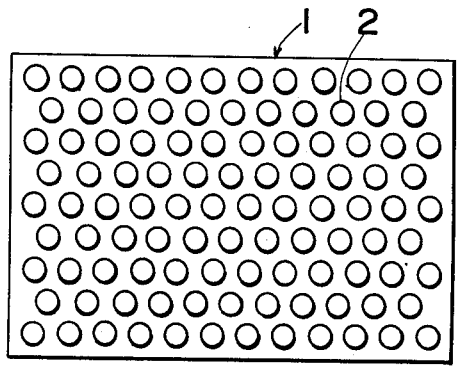
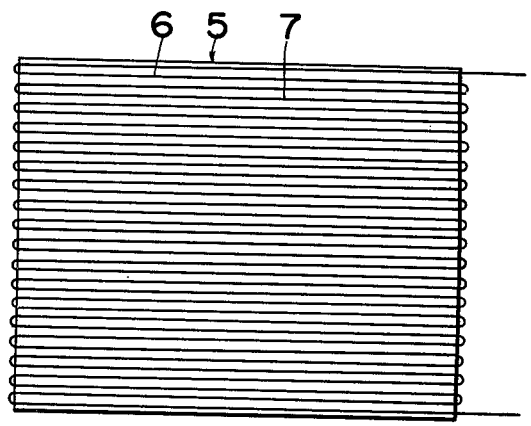
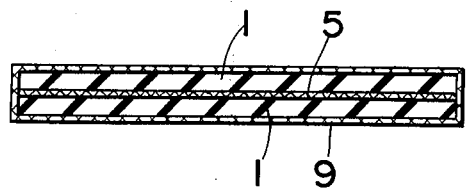
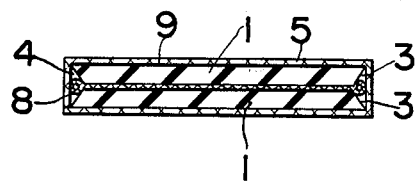
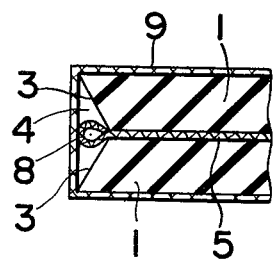

ELECTROTHERMALLY DEFORMABLE LEVELLING PAD

The present invention relates to an electrothermally deformable levelling pad utilizable in padding, levelling or aligning girders, rails or any other constructional or structural elements and, more particularly, to a constructional device comprising a body of thermoplastic material having embedded therein an electric heater, which electric heater is, while the constructional device is placed in between a load exerting member and a load receiving member, energized to electrothermally deform the body of thermoplastic material so as to permit the load exerting member to assume a definite position relative to the load receiving member.

The present invention pertains to the electrothermally deformable levelling pad which is advantageously utilized in railway construction and, more particularly, in levelling a railway track structure, composed of a line of rails, relative to a levelled railroad having a rough roadbed for supporting the railway track structure thereon.

It is well known that, when a railway track structure composed of a line of rails is to be erected, the track structure is laid on the roadbed of a railroad which may include either a pavement of ballast or a pavement of slabs of reinforced or prestressed concrete. In addition, it is well known that depending upon the type of the slabs and the amount of loads they may receive, the slab-paved roadbed may not require the use of crossties or sleepers for the support of the rails in a predetermined track gauge. Prior to placement of the railway track structure on the railroad, the roadbed should be prepared to assume a predetermined level as exactly as possible over the entire length thereof.

However, the exact levelling of the roadbed is difficult and, therefore for the purpose of compensation for a difference between the actual level of the railway track structure relative to the roadbed deviation at one local position and that at another local position, several methods have heretofore been practised. One of these methods is the use of filler pads, made of compressed rubber, which are individually placed between the rails and the roadbed, or the crossties if employed, in spaced relation to each other in the lengthwise direction of the track. Another one of these method is the use of bags placed in a substantially similar manner as the filler pads and subsequently filled with a grout of synthetic material which is solidificable upon evaporation of solvent.

According to the first mentioned method, a considerable number of filler pads are required which are of different thickness, right for various positions in the roadbed where the track tends to sink below its specific level. In other words, the filler pads are required in a number substantially corresponding to the number of deviations in the roadbed level. On the other hand, according to the second mentioned method, because of the grout in a fluid state, maintenance, handling and grouting operation with the grout are all difficult.

In addition to the individual disadvantages referred to above, performance of any of the first and second mentioned methods is complicated in procedure and is time-consuming and labor-consuming.

In the case where an architectural frame or girder or a heavy-duty machine is to be installed on a levelled concrete floor, some anchor bolts are utilized. These anchor bolts are embedded in portion of the concrete floor where the architectural frame or the heavy-duty machine is to be installed. If at least that portion of the concrete floor fails to be levelled, the usual procedure to bring the architectural frame or the machine to a predetermined level has heretofore been carried out by reforming that portion of the concrete floor so as to achieve a predetermined level while the individual anchor bolts are accurately positioned so as to align with the architectural frame or the machine. In this procedure, some disadvantages are still found in that complete solidification of concrete material used to reform the portion of the floor creates delays and in that alignment of the individual anchor bolts during levelling of that portion of the floor is difficult. In other words, this levelling procedure is complicated and, similarly, time-consuming and labor-consuming.

In order to avoid the disadvantages and inconveniences referred to above, there has recently been proposed an electrothermally deformable levelling pad which includes an electric heater of a substantially platelike or planar shape fitted to one surface of a thermoplastic plate member or preferably sandwiched between a pair of thermoplastic plate members. The electrothermally deformable levelling pad of the construction referred to above is utilized in practice in the following manner.

Firstly, the electrothermally deformable leveling pad is placed in position between a foundation, for example, each of tie plates on the roadbed, and the bottom or foot of a rail forming a part of the railway track structure. The electric heater is subsequently energized to heat the thermoplastic plate members. The thermoplastic material which constitutes the individual plate members being heated becomes softened and, therefore, deforms as it receives an external pushing force, that is, the weight of the rail acting on the plate members in a direction perpendicular to the plane of the plate members, that is, in a direction of the thickness of the plate members. In this way, bringing the rail to a desired or predetermined level can be carried out by the thickness deformation of the plate members.

The electrothermally deformable levelling pad of the type heretofore proposed can also be utilized not only in levelling, but also in padding or aligning any other constructional or structural elements in a substantially similar way as the electrothermally deformable levelling pad of the present invention would be practised.

Insofar as railway construction is concerned, the electrothermally deformable levelling pad heretofore proposed is successful in substantially eliminating the disadvantages and inconveniences inherent in the conventional levelling technique. The use of the electrothermally deformable levelling pad in fact facilitates levelling, but in order for the electrothermally deformable levelling pad to exhibit highly reliable performance, it has been recognized that material for the plate member or plate members should satisfy the following requirements.

1. Be a thermoplastic,
2. Be capable of exhibiting a sufficient melt viscosity even when heated to a temperature above the softening point thereof,
3. Have a relatively high load bearing properties in terms of compressive creep, compressive stress and impact strength,
4. Have a sufficient elasticity, in terms of spring constant, compressive modulus and hardness, to an extent that vibrations can be absorbed, and 5. Exhibit no substantial change in physical property even when subjected to a temperature within a practical range of from the brittle point temperature of below −40°C. to the minimum fluidizing temperature of above +80°C., which minimum fluidizing temperature means the temperature at which the material commences to fluidize.

However, the material satisfying each item of the above requirements is not known. A synthetic thermoplastic resin now commercially available is apt to exhibit such a characteristic that the melt viscosity reduces rapidly when it is heated to a temperature above the softening point. If this commercially available thermoplastic resin is used as the material for the plate members of the electrothermally deformable levelling pad, a sufficient levelling or padding cannot be appreciated because the resin tends to readily fluidize before the levelling or padding is complete.

A certain synthetic resin having a sufficient hardness is also commercially available. However, this synthetic resin does not exhibit a sufficient elasticity and has no property of absorbing vibrations and/or impact applied thereto and, therefore, if it is used as material for the plate members of the electrothermally deformable levelling pad, the latter will readily be fractured under the influence of vibrations and/or impact and cannot accordingly be used where the vibration and/or impact is present.

As a synthetic thermoplastic resin having a sufficient elasticity, ethylene-vinyl acetate copolymer, styrene-butadiene block copolymer and polyurethane elastomer are known. However, the above two copolymers have common drawbacks in that, when subjected to a predetermined load, any of these copolymers is greatly deformed and in that considerable change in physical property occurs when any of these copolymers is handled under conditions in which the temperature varies from −40°C. to +80°C. and, on the other hand, the elastomer lacks a stability in terms of water, weather and heat resistance.

Accordingly, an essential object of the present invention is to provide an improved electrothermally deformable levelling pad which is effective to facilitate levelling, padding or aligning work accurately and reliably, thereby substantially eliminating the disadvantages and inconveniences heretofore encountered in similar work.

Another important object of the present invention is to provide an improved electrothermally deformable levelling pad of the type referred to above, which exhibits a sufficient durability under severe conditions in which it is used.

A further object of the present invention is to provide an improved electrothermally deformable levelling pad of the type referred to above, in which a synthetic resin satisfying the foregoing requirements is utilized to improve the overall performance and durability thereof.

According to the present invention, there is provided an improved electrothermally deformable levelling pad which comprises at least one plate member, made of thermoplastic material, and at least one electric heater fitted to one surface of the plate member. The levelling pad of the above construction may include a covering enclosing the plate member and the heater together, said covering being made of a sheet of thermal insulating material, for example, non-woven sheet of polyester.

The respective numbers of the plate member and the heater may not be limited to one. Two heaters for one plate member can be employed, in which case the individual heaters are fitted to both surfaces of the plate member. Moreover, one heater for two plate members may be employed, in which case the heater is sandwiched or held in position between the individual plate members. In the case where three or more plate members are employed, the heater is preferably employed in a corresponding number. By way of example, assuming that the number of the plate members employed is three, at least two heaters can be employed which are respectively held in position between one plate member and the next adjacent plate member, or four heaters can be employed at maximum, two of which are respectively held in position between one plate member and the next adjacent plate member while the other two are respectively fitted to the outer surfaces of the assembled plate members.

In the case where two or more electric heaters are employed, they may electrically be series-connected, or otherwise connected to a common source of electric power through a suitable connection, for example, by the use of a power distributing coupler.

The electric heater is preferably of a planar tupe similar to that employed in an electric blanket. Although any other type of electric heater may be employed, the use of the planer heater is preferred for the reason which will become apparent from the later description.

Material for the plate member may be a thermoplastic random-copolymerized polyester of a particular composition herein disclosed, which has a melt viscosity of less temperature dependence; a minimum fluidizing temperature of above 80°C., preferably, within the range of 100 to 260°C.; a brittle point temperature of not higher than −40°C.; a compressive stress within the range of 5 to 1,000 kg/cm$^2$ at the time 5% deformation thereof takes place; a compressive modulus of 300 to 20,000 kg/cm$^2$; an impact strength of not less than 5 kg.cm/cm; and a hardness of not less than 20 as measured by the use of a D-type Shore durometer.

More specifically, the material for the plate member comprises a random copolymerized polyester prepared from an acid component and a glycol component. The acid component is of a kind comprising an aromatic carboxylic acid and an aliphatic dicaroboxylic acid having 6 or more carbon atoms, the ratio of the amount of the aromatic carboxylic acid residue relative to the amount of the aliphatic dicarboxylic acid residue being within the range of 40/60 to 95/5 in terms of a mol ratio. The glycol component employed is at least one selected from the group consisting of an aliphatic diol, an aromatic diol and an alicyclic diol.

The type of random copolymer to be selected as a material for the plate member depends on the purpose for which the resultant levelling pad is utilized and characteristics the resultant levelling pad is desired to have. By way of example, if the resultant levelling pad is desired to have relatively high load bearing properties and a relatively high vibration-damping property, the acid component forming a part of the random copolymer for the material of the plate member preferably contains the aliphatic dicarboxylic acid of not less than 6 carbon atoms in a relatively great amount. Alternatively, the acid component containing the aliphatic dicarboxylic acid having a relatively great number of carbon atoms may be employed as a part of the random copolymer.

If the resultant levelling pad is desired to have relatively high load bearing properties and relatively high hardness and mechanical strength, the random copolymer which contains as the aromatic dicarboxylic acid, one of terephthalic acid and naphthalene dicarboxylic acid may be employed. Moreover, if the resultant levelling pad is desired to be capable of withstanding a highly elevated temperature, the random copolymer which contains as the aromatic dicarboxylic acid component one of the terephthalic acid and naphthalene dicarboxylic acid and, as the glycol component, the aliphatic glycol, such as ethylene glycol or tetramethylene glycol, having a relatively small number of carbon atoms, may be employed. In addition, if the resultant levelling pad is desired to have a relatively high oil resistance and durability, the random copolymer wherein the aliphatic dicarboxylic acid having a relatively great number of carbon atoms may be employed.

In view of the nature and construction of the levelling pad according to the present invention, not only the levelling operation can be facilitated, but also an accurate and effective levelling can be realized. The levelling pad according to the present invention has many fields of application. By way of example, in view of the fact that the levelling pad is imparted a sufficient elasticity to provide a relatively high vibration damping property with improvement in load bearing properties, the levelling pad herein disclosed can be utilized to bring a precision machine to a predetermined level irrespective of the surface condition of a foundation or floor on which the machine is to be installed.

The levelling pad herein disclosed is also suited for use in levelling practised not only during machine installation, but also during railway construction or building construction, and under any circumstance even where the levelling pad might be exposed to a rapid variation in ambient temperature for a substantially long period of time.

In addition, the levelling pad herein disclosed can also be used as a padding device or an aligning device. An example of the use as a padding device would be filling a gap or clearance between a certain structural member, for example, stationarily held in position, and a subsequently adjacently installed structure member, the final size of which gap or clearance could have been neither predicated nor measured at the time of installation of the adjacent structural member relative to the certain structural member. In this case, the padding device in the form of the levelling pad herein disclosed may be executed in such a manner as to place it in the gap or clearance prior to final fixing of the size of such gap or clearance, subsequently to energize the built-in heater to heat the plate member forming a part of the levelling pad, and finally to move the subsequently installed structural member relative to the stationarily held structural member thereby to apply an pushing force to the padding device until the final, desired or predetermined size can be achieved in the gap or clearance. Supply of electric power to the built-in heater may be interrupted, at the time or shortly before the gap or clearance achieves the final size, to allow the softened plate member to solidify with its thickness deformed to a value corresponding to the final size of the gap or clearance.

In the case where the structural members referred to above are, so far from the gap or clearance between these members being filled, desired to be placed or installed on the same level and in line with each other, it will be readily understood that the levelling pad herein disclosed can, if placed between one or both of the structural members and the floor or foundation and operated in a similar manner as hereinbefore described, act as the aligning device.

In any event, if one or more of reinforcing agent, modifier, ultraviolet ray absorbent, fire proofing agent and any other additives are added to the random copolymer during the preparation thereof, additional and/or cumulative properties attributable from the addition of one or more of these additives can be imparted to the resultant levelling pad in addition to those attributable from the selection of material for the random copolymer.

The aromatic carboxylic acid forming a component of the random copolymer which is used as the material for the plate member is either an aromatic dicarboxylic acid or an aromatic hydroxylic acid. More particularly, terephthalic acid, isophthalic acid, 1,5-naphthalene dicarboxylic acid, 2,6-naphthalene dicarboxylic acid, 2,7-naphthalene dicarboxylic acid, 4,4'-diphenyl dicarboxylic acid, bis(4-carboxyphenyl)methane, 4,4'-sulfonyldibenzoic acid, 4-(2-hydroxyethoxy)benzoic acid, 4-hydroxy benzoic acid and others can be enumerated. Of these aromatic carboxylic acids, the terephthalic acid or the naphthalene dicarboxylic acid is preferred.

Examples of the aliphatic dicarboxylic acid having not less than 6 carbon atoms are adipic acid, pimelic acid, suberic acid, azelaic acid, sebacic acid, undecane dicarboxylic acid, dodecane dicarboxylic acid, brassiline acid, tetradecane dicarboxylic acid and others. However, the aliphatic dicarboxylic acid having not less than 9 carbon atoms is preferred.

For the aliphatic diol, the aromatic diol and the alicyclic diol, ethylene glycol, propylene glycol, tetramethylene glycol, pentamethylene glycol, 2,2-dimethyl trimethylene glycol, hexamethylene glycol, decamethylene glycol, neopenthyl glycol, p-xylylene glycol, 1,4-cyclohexane dimethanol and others can be enumerated. However, the use of the aliphatic diol, preferably, a diol which is represented by the formula $HO(CH_2)_nOH$, wherein $n$ is a number selected from 2 to 10, is recommended. The diol which is more preferred in the present invention is ethylene glycol, trimethylene glycol and tetramethylene glycol.

The random-copolymerized polyester can be prepared by reacting the aromatic carboxylic acid and at least one of the aliphatic dicarboxylic acid and its derivatives and the diol by the use of a known method such as ester exchange reaction or direct esterification. During the reaction effected to produce the random copolymerized polyester, one or more known catalysts can be employed in a relatively wide range. The resultant random copolymerized polyester should contain the acid component in an amount such as to render the mole ratio of the aromatic dicarboxylic acid residue relative to the aliphatic dicarboxylic acid residue within the range of 40/60 to 95/5, or otherwise the random-copolymerized polyester which satisfies the foregoing requirements cannot be obtained. The mole ratio of 60/40 to 95/5 is preferred. If the amount of the aliphatic dicarboxylic acid is not less than 60 mole %, the resultant random copolymerized polyester would have improved flexibility and impact strength, but the minimum fluidizing temperature thereof would be lowered and, therefore, it will not be able to withstand against variation of the ambient temperature within the practical range referred to above. On the other hand, if the amount of the aliphatic dicarboxylic acid is not more than 5 mole %, the resultant random copolymerized polyester would have a lesser flexibility and a relatively high minimum fluidizing temperature and, therefore, it cannot be suited as the material for the plate member forming a part of the levelling pad of the present invention.

Examples of the resultant random copolymerized polyester useable in the present invention are a polyethylene terephthalate-sebacate random copolymer; a polyethylene terephthalate-adipate random copolymer; a polyethylene terephthalate-azelate random copolymer; a polyethylene terephthalate-dodecanoate random copolymer; a polyethylene terephthalate/isophthalate-sebacate random copolymer; a polytetramethylene terephthalate-adipate random copolymer; a polytetramethylene terephthalate-sebacate random copolymer; a polytetramethylene terephthalate-azelate random copolymer; a polytetramethylene terephthalate-dodecanoate random copolymer; a polyethylene naphthalate-sebacate random copolymer, a polytetramethylene naphthalate-adipate random copolymer; a polytetramethylene naphthalate-azelate random copolymer; a polytetramethylene naphthalate-dodecanoate random copolymer; a poly-4-(2-hydroxyethoxy) benzoate-adipate random copolymer; a poly-4-hydroxybenzoatesebacate random copolymer; and others.

In most cases, the random copolymerized polyester has a number of favorable properties suited as the material for the plate member. However, one or all of thermal-oxidation preventing agents, ultraviolet ray absorbents and hydrolysis preventing agents may be added to the random copolymerized polyester during the preparation thereof to stabilize the random copolymerized polyester against thermal oxidation, ultraviolet ray and/or hydrolysis, respectively. Examples of the thermal oxidation preventing agent which may be employed are phenols and their derivatives, aromatic amines, thiopropionic acid esters, and so on. Examples of the ultraviolet ray absorbent which may be employed are substituted benzophenones, substituted benzotriazoles and so on, while examples of the hydrolysis preventing agent which may be employed are polycarbodiimides and others.

Any suitable powdered or fibrous filler material such as carbon black, silica, calcium carbonate, glass fiber, carbon fiber or asbestos may be added to the random copolymerized ester. Addition of the filler material is advantageous in that the elastic modulus of material can be improved and the melt viscosity of the random copolymerized polyester at the time said polyester is heated to an elevated temperature substantially above the softening point thereof can also be improved. This means that the resultant levelling pad can advantageously used to facilitate the levelling or padding work in an accurate manner.

Furthermore, the random copolymerized polyester may contain one or both of pigment and fireproof agent if desired.

As the material for the plate member, the random copolymerized polyester of the composition as hereinbefore described can, because of being thermoplastic, be molded into a desired shape of the plate member by any known method, for example, by means of an injection molding technique, an extrusion molding technique or a compression molding technique. The shape and size of the plate member may be selected in consideration of those of a gap or clearance where the levelling pad is to be installed.

Figure 8:
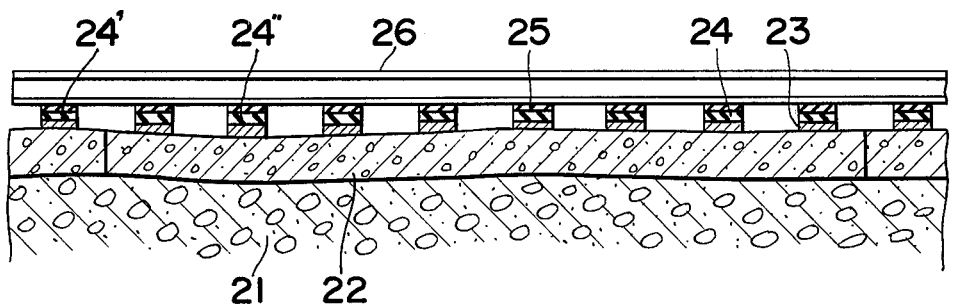
Figure 9:
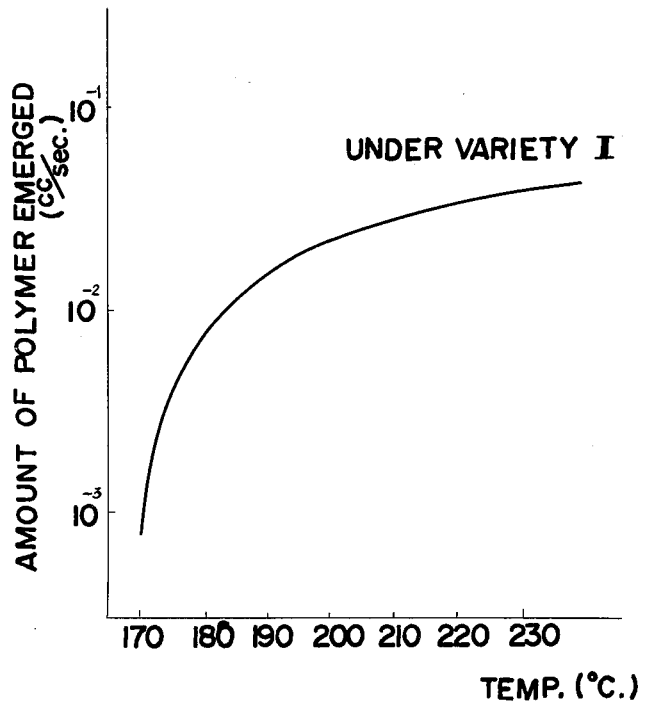

These and other objects and features of the present invention will readily become understood from the following description taken in conjunction with a preferred embodiment thereof with reference to the accompanying drawings, in which:

FIG. 1 is a schematic perspective view of an electrothermally deformable levelling pad according to the present invention, with a portion thereof broken away to show the construction thereof, FIG. 2 is a top plan view of a thermoplastic plate member employed in the levelling pad of FIG. 1, FIG. 3 is a top plan view of an electric heater employed in the levelling pad of FIG. 1, FIG. 4 is a cross sectional view taken along the line IV—IV in FIG. 1, FIG. 5 is a cross sectional view taken along the line V—V in FIG. 1, FIG. 6 is a cross sectional view, on an enlarged scale, of a portion of FIG. 5, FIG. 7 is a schematic sectional view of a portion of a railway track structure as viewed in a direction parallel to the lengthwise direction of a rail, FIG. 8 is a schematic side sectional view of the railway track structure as viewed in a direction perpendicular to the lengthwise direction of the rail, and FIG. 9 is a graph illustrating variation of the viscosity of the thermoplastic plate member in relation to variation of the temperature.

Before the description of the invention proceeds, it should be noted that, for facilitating a better understanding thereof, the electrothermally deformable levelling pad according to the present invention will now be described as having a substantially rectangular configuration and as used in bringing a rail to a predetermined or required level.

Referring first to FIGS. 1 to 6, an electrothermally deformable levelling pad comprises a pair of plate members 1 of the same size and made of the random copolymer of the composition as hereinbefore fully described, and a planar electric heater 5 sandwiched or held in position between these plate members 1. Depending upon the width at the bottom or root of the rail to be levelled and the length of a tie plate to be placed on a crosstie or a slab under the rail, as will be described later, each of the plate members 1 for the levelling pad used for this purpose may, for example, be 5 mm. in thickness, 125 mm. in width and 185 mm. in length.

Each of the plate members 1 is formed with a plurality of holes 2 each being, for example, circular in cross-section and extending completely through the thickness of the plate member 1. If reduction of the sum of the thicknensses of the plate members 1 in an amount of approximately 4 mm. is desired (which is achieved by heating the plate members 1 so as to deform under loaded condition in such a manner as will be described later), the sum of the total cross-sectional areas or volumes of the holes 2 in both of the plate members 1 preferably occupies about 40% of the sum of the total surface areas or volumes of both of the plate members 1. Accordingly, so far as the above described dimensions of each of the plate members 1 are concerned, each of the holes 2 may, for example, have a diameter of 10 mm.

The holes 2 in both of the plate members 1 act as means for accommodating portion of the thermoplastic resin forming the individual plate members 1 to permit the latter to be reduced in thickness by the load imposed upon the levelling pad, at the time said plate members 1 are heated to soften or melt. In other words, when the heater 5 is energized to heat the plate members 1 while the load is imposed on the levelling pad so as to act in a substantial direction of thickness of the levelling pad, the individual plate members 1 begin to fluidize, permitting the thickness of each of the plate members 1 to be reduced while the fluidized portion of the individual plate members 1 substantially fills up the holes 2. Therefore, so long as that portion of the plate members in a fluidized state can be accommodated in compensation for reduction of the sum of the total thicknesses of the individual plate members 1, not only may each of the holes 2 may have a cross-sectional shape other than the circular shape, but also a plurality of grooves or a plurality of projections may be employed in place of the illustrated holes 2, in which case the grooves or projection should be formed on one of the surfaces of each of the place members 1 which faces the planar heater 5. Moreover, if the circumstance permits, the random copolymer for the individual plate members 1 may be in the form of a sintered thermoplastic resin prepared by sintering a thermoplastic resin powder to provide porosity in each of the plate members 1.

The holes 2 or any other substitutes therefor are not always necessary depending upon the use of the levelling pad of the present invention. However, the provision of the holes 2 or their substitutes is recommended in view of the fact that reduction in thickness of the levelling pad can readily be achieved and, in addition, a handsome finish can be achieved.

As best shown in FIGS. 5 and 6, each of the plate members 1 has both sides 3 inclined at an acute angle relative to the plane of the planar heater 5 so that, when both of the plate members 1 are secured, in such a manner as will be described later, with the heater 5 held in position between these plate members 1, substantially inwardly extending V-shaped grooves are respectively formed as at 4 on both sides of the resultant levelling pad. These grooves 4 function in a substantially similar manner as the holes 2.

The planar heater 5 is, as best shown in FIG. 3, in the form of a substantially flat, woven heating mat 6 of a size having a length substantially equal to the length of each of the plate members and a width greater than the width of each of the plate members by a few milimeters, which woven heating mat 6 has filaments of glass fiber forming the warp and a continuous, thin heating wire 7 forming the woof. Said filaments of glass fiber and said heating wire 7 are woven together as if to provide a woven cloth. It will therefore be seen that the heating wire 7 extends in a substantially zig-zag manner in the direction of the warp, transversing the filaments of glass fiber.

The heating wire 7 for this purpose may be employed in the form of a copper wire of 0.18 mm. in diameter and the number of substantially equally spaced runs of the continuous heating wire 7 extending in the zig-zag manner is preferably within the range of 15 to 30 per inch.

The planar heater 5 is held in position between the plate members 1 in such a manner as will now be described. As hereinbefore described, the width of the heater 5, more particularly, the width of the woven heating mat 6, is greater than the width of any of the plate members 1. Therefore, both side portions of the woven heating mat 6, after having been secured with respective lengths of electrically insulating, adhesive tape (not shown), are turned up to provide corresponding loops 8, which loops 8 are, when the woven heating mat 6 is held in position between the plate members 1, accommodated within the respective V-shaped grooves 4 each defined by the side faces 3 of the associated plate members 1.

In order to secure the plate members 1 and the planar heater 5 in the aforesaid arrangement, a bonding agent may be used. However, according to the present invention, taking advantage of the thermoplastic resin forming any of the plate members 1, fusion-bonding is employed. This can be achieved in such a manner that, while the heater 5 is held in position between the plate members in the predetermined arrangement, the heater 5 is first temporarily energized for a period of time sufficient to cause the individual surfaces of the plate members 1, which contact the woven heating mat 6, to melt and the plate members with the heater 5 therebetween are subsequently allowed to stand until the melted surfaces of the plate members 1 solidify. It will readily be seen that at the time of completion of the fusion bonding, both surfaces of the woven heating mat 6 have been interlocked with the respective surfaces of the plate members 1.

As best shown in FIG. 1, one of the opposite end faces of any one of the plate members 1 is provided with a pair of terminal members 10 which may, for example, be embedded into the end face of the plate member 1 with respective portions externally projected. These terminal members 10 are respectively connected with opposite ends of the heating wire 7, naked portions adjacent the opposite ends of the heating wire 7 being inserted through individual electrically insulating sheathings 11. Extending from the terminal members 10 is a pair of lead wires 12 having one ends connected to said terminal members 10 and the other ends connected to a coupler 13, for example, a plug-in jack, for connection with a source of electric power.

The levelling pad of the above construction may be enclosed, or otherwise packed, within a covering 9 made of a non-woven polyester sheet of 0.1 to 0.2 mm. in thickness. The use of the covering 9 is advantageous in that a loss of thermal energy originating from the energized heating wire 7 can be substantially reduced.

It is to be noted that although the heating wire 7 has been described as extending in the substantially zig-zag manner, it may be arranged in a substantially spiral or coiled configuration which is recommended in case where the levelling pad is desired to be circular in shape.

It is also to be noted that the term "planar heater" employed in this specification and appended claims is intended to mean a heater, such as designated by 5 of the above construction, of a type capable of emitting heat energy uniformly from at least one surface thereof in a direction substantially perpendicular to said surface. The employment of this type of heater as practised in the present invention is particularly advantageous in respect that the whole surface of each of the plate members 1 which contacts the heater should be softened or melted uniformly to facilitate simultaneous displacement of local points in each plate member 1 in the direction of thickness of said plate member in accordance with distribution of the load applied thereon.

The levelling pad of the aforesaid construction is practically used in such a manner as will now be described with particular reference to FIGS. 7 and 8.

Before describing the manner to use the levelling pad of the present invention, a typical roadbed construction will first be described. The roadbed in the illustrated embodiment is shown in the form of a concrete roadbed 21 and includes slabs 22, for example, 5 meters in length and made of reinforced or prestressed concrete, which slabs are paved end-to-end on the upper surface of the concrete roadbed 22. Secured on the upper surface of the pavement of the slabs 22 and equally spaced, for example, 0.6 meter from each other in a straight line are tie plates 23 of a shape substantially as shown in FIG. 7. A length of rail 26 is to be supported on the tie plates 23.

Assuming that the upper surface of the foundation which is defined by the pavement of the slabs 22 and on which the tie plates 23 rest in the straight line is rough, there will be a possibility of formation of a clearance between the bottom of some of recesses 23a in the respective tie plates 23 and the bottom face of the rail 26 when the latter is placed on the tie plates 23 with the bottom thereof engaged in the recesses 23a, and in an extreme case, the rail 26 will extend, for example, diverging from the horizontal level.

In order to avoid this possibility, prior to the rail 26 being fixed to the tie plates 23, a required number of levelling pads, generally indicated by 24 and each being of the construction as hereinbefore fully described, are placed one for each tie plate and held in position within the recesses 23a of the respective tie plates 23, and the rail 26 is subsequently lowered to rest on the levelling pads 24. At this time, rubber pads 25 corresponding in number to the levelling pads 24 employed may be placed in between the levelling pads 24 and the bottom face of the rail 26, if desired, for substantially absorbing shocks which may be created as a train run on the track.

If the planar heaters 5 of the respective levelling pads 24 are energized, for example, merely by connecting the individual plug-in jacks 13 to the common source of electric power, to heat the plate members 1 in the manner as hereinbefore described, each of the plate members 1 of any of the levelling pads 24 begins to melt from the surface adjacent the corresponding heater 5 to the opposite surface and, as melting of the plate members 1 in all the levelling pads 24 progresses, the rail 26 is lowered by its own gravity while the thickness of each of the levelling pads 24 decreases. During this process, the volume of a space where any one of the levelling pads 24 is accommodated and which is substantially defined by wall portions, defining the recess 23a in each tie plate 23, and the bottom face of the rail 26 decreases as the rail 26 is lowered, and the melted resin forming each of the plate members 1 tends to externally ooze from the above mentioned space. However, by the provision of the holes 2 in each plate member 1, this oozing action can be advantageously avoided. In other words, some or all of the holes 2 in the plate members 1 of each of the levelling pads 24 become filled up with the melted resin in a substantially proportional relation to reduction of the volume of said space.

At the time of completion of lowering of the rail 26 to, for example, the horizontal level above the foundation, the rail 26 becomes supported temporarily on a plurality of adjustment pieces (not shown) that have previously been installed below the rail 26 one for each interval between one tie plate and the next adjacent tie plate. It should be noted that the adjustment pieces may have different height, but should have the top surfaces lying on the same plate in conformity of the horizontal level to which the rail 26 is brought. Shortly before the completion of the rail lowering or simultaneously therewith, the planar heaters 5 of all the levelling pads 24 are deenergized to interrupt the heating operation and, thereafter, the individual pads 24 are allowed to stand until the melted portions of the plate members of each pad 24 solidify completely while the rail 26 is still supported on the adjustment pieces.

Removal of the adjustment pieces from between the rail 26 and the foundation is effected after the melted portions of the plate members 1 of each pad 24 completely solidify. Insofar as the adjustment pieces or any other like support means are removed after the melted portions of the plate members 1 of each levelling pad 24 have completely been solidified, removal thereof does not cause the rail 26, once brought to the predetermined level, to displace from the predetermined level. Thus, it will be readily seen that the rail 26 can be accurately brought to the predetermined level even though the space between the foundation, which is defined by the pavement of the slabs 22, and the predetermined level thereabove varies from point to point because of roughness in the surface of the foundation.

More particularly, it has been experienced that bringing one slab 22 exactly to the same level as the next adjacent slab 22 is technically impossible and, therefore, roughness is always present in the pavement of the slabs 22. If the levelling work is carried out by the use of the levelling pads according to the present invention, as clearly shown in FIG. 8, the levelling pads 24 vary in overall thickness in compensation for variation of the space between the foundation and the predetermined level to which the rail 26 is brought, thereby holding the rail 26 to the predetermined level. Comparision of two of the levelling pads, such as indicated by 24' and 24'', for example, illustrates this fact. The same notion can apply to the other levelling pads. Therefore, no gap or clearance will be created between the bottom face of the rail 26 and the upper surface of any of the rubber pads 25, if the latter are employed, or of any of the levelling pads 24 if said rubber pads 25 are not employed.

It should be noted that the levelling pad 24 and the rubber pad 25 may be reversed in position. Moreover, each levelling pad 24 may, instead of being placed in between the rail 26 and the tie plate 23, be placed in between the tie plate 23 and the foundation, i.e., the slab 22.

Although in the foregoing embodiment, the tie plates 23 have been described as rigidly secured to the foundation, they may be rigidly secured to crossties or sleepers which are in turn secured to the slabs 22 or to the concrete roadbed 21, or otherwise supported on the known ballast, spaced several ten centimeters apart from each other.

The following example illustrates the present invention without limiting the same thereto.

EXAMPLE

Variety I

A random copolymerized polyester comprising the acid component, which contains terephthalic acid and sebacic acid, the mole ratio of the terephthalic acid residure relative to the sebacic acid residue being 50/50, and the glycol component which is an ethylene glycol.

Variety II

A random copolymerized polyester comprising the acid component, which contains terephthalic acid and dedecane dicarboxylic acid, the mole ratio of the terephthalic acid residue relative to the dodecane dicarboxylic acid residue being 70/30, and the glycol component which is an tetramethylene glycol.

Variety III

A random copolymerized polyester comprising the acid component, which contains terephthalic acid and sebacic acid, the mole ratio of the terephthalic acid residue relative to the sebacic acid residue being 75/25, and the glycol component which is a tetramethylene glycol.

Variety IV

A random copolymerized polyester comprising the acid component, which contains 2,7-naphthalene dicarboxilic acid and dodecane dicarboxylic acid, the mole ratio of the terephthalic acid residue relative to the dodecane dicarboxylic acid residue being 80/20, and the glycol component which is tetramethylene glycol.

For the purpose of characteristic testing, injection molded test pieces were each prepared from a dry-blended mixture of 100 parts of the random copolymerized polyester under the individual Varieties I to IV, 0.3 part of 4,4'-thio-bis(6-tert-butyl-3-methylphenol), 0.3 part of distearyl dithiopropionate and 0.5 part of carbon black (manufactured by Mitsubishi Chemical Industries Ltd. under the tradename Fanes Black HAF). The test results are tabulated in the following table.

| Types of Test | Types of Testpieces | | | |
|---|---|---|---|---|
| | I | II | III | IV |
| Minimum Fluidizing Temperature (°C.) | 145 | 180 | 190 | 205 |
| Brittle Point Temperature (°C.) | below −70 | below −70 | below −70 | below −70 |
| Shore Scale-D Hardness | 24 | 40 | 45 | 50 |
| Tensile Strength at Breakage (kg/cm$^2$) | 160 | 265 | 290 | 400 |
| Tensile Elongation at Breakage (%) | 800 | 600 | 450 | 320 |
| Compressive Stress at 5% Deformation(kg/cm$^2$) | 8 | 24 | 120 | 130 |
| Compressive Elastic Modulus (kg/cm$^2$) | 450 | 3,000 | 4,200 | 5,000 |
| Impact Strength (kg.cm/cm) | Not broken | Not broken | Not broken | Not broken |

It should be noted that the testpieces I, II, III and IV respectively contain the random copolimerized polyesters under individual Varieties I, II, III and IV described above.

Measurement of the particulars of each of the testpieces I to IV was carried out in the following manner.

Minimum Fluidizing Temperature:

The temperature at the time the polymer heated at a rate of 30°C. per minute had just emerged at a rate of 10$^{-3}$cm$^3$/sec. from a nozzle, 10 mm. in length and 1 mm. in inner diameter, which nozzle is provided in a Koka flow tester.

Brittle Point Temperature:

According to the Japanese Industrial Standards as specified by K-6301.

Shore Hardness:

According to ASTM D-2240, Shore-D Scale.

Tensile Strength:

According to the Japanese Industrial Standards as specified by K-6301.

Tensile Elongation:

According to the Japanese Industrial Standards as specified by K-6301.

Compressive Stress:

According to the Japanese Industrial Standards as specified by K-6911.

Impact Strength:

According to the Japanese Industrial Standards as specified by K-6911.

Compressive Elastiic Modulus:

According to the Japanese Industrial Standards as specified by K-6911.

The temperature dependence of the melt viscosity of the random copolymerized polyester under Variety II was tested by the use of the Koka flow tester. At this time, the flow tester was equipped with a nozzle of 10 mm. in length and 1 mm. in inner diameter. The random copolymerized polyester under Variety II was heated at a rate of 3°C./min. and subjected to a pressure of 100 kg/cm$^2$. The result of the measurement is such as shown in FIG. 9, which illustrates a curve representing a relationship between the temperature of the random copolymerized polyester and the rate at which the random copolymerized polyester under pressure emerged from the nozzle of the flow tester.

From the graph of FIG. 10, it will readily be seen that the testpiece II prepared by the use of the random copolymerized polyester under Variety II according to the present invention clearly satisfy the requirements (1) to (5) hereinabove described.

From the foregoing full description of the present invention, it has now become clear that the levelling pad according to the present invention is effectively utilized in levelling, padding or aligning girders, rails or any other constructional or structural elements merely by heating at least one thermoplastic plate member to allow the thickness thereof to reduce with the concurrent application of pressure thereto. Moreover, the levelling pad according to the present invention can be easily manufactured at a relatively low cost. No substantial change in physical properties with time occur in the levelling pad of the present invention and, therefore, the levelling pad of the present invention can be left where it has been installed without causing any levelling, padding or alignment error.

Although the present invention has been fully described by way of example, it should be noted that various changes and modifications are apparent to those skilled in the art. By way of example, each of the side faces 3 of any of the plate members 1 may be at right angles to the plane of the corresponding plate member. In any event, such changes and modifications should be construed as included within the true scope of the present invention unless otherwise they depart therefrom.

What we claim is:

1. An electrically heated alignment pad which comprises at least one flat plate member of thermoplastic resin, and at least one thin flat electric heater having one surface laying against substantially the whole flat surface of said plate member for heating said plate member to soften said plate member, the other surface of said heater adapted to be held in electrically insulated relationship to the surface supporting it and to an article to the aligned, said plate member and heater having a structure the thickness of which is reduced when an external compressive force is applied thereto when said plate member is in the heat softened condition, whereby an object through which the compressive force is applied can be moved by the reduction of thickness of the alignment pad for adjusting the position thereof in the direction of the force being applied to the alignment pad; said plate member having a plurality of apertures therein into which portions of said plate member around said apertures flow laterally upon the softening of said plate member when said compressive force is applied thereto and to be filled up with melted portion of the thermoplastic resin when the latter is heated; said thermoplastic resin being a random copolymerized polyester which comprises an acid component, which contains an aromatic carboxylic acid and an aliphatic dicarboxylic acid having not less than 6 carbon atoms, the mole ratio of the aromatic carboxylic acid residue relative to the aliphatic dicarboxylic acid residue relative to the aliphatic dicarboxylic acid residue in said copolymer being within the range of 40/60 to 95/5, and a glycol component which is at least one compound selected from the group consisting of an aliphatic diol, an aromatic diol and an alicyclic diol.

2. An electrothermally deformable levelling pad as claimed in claim 1, wherein said mole ratio is within the range of 60/40 to 95/5.

3. An electrothermally deformable levelling pad as claimed in claim 1, wherein said aromatic carboxylic acid contains terephthalic acid in an amount of not less than 60 mole percent.

4. An electrothermally deformable levelling pad as claimed in claim 3, wherein said aliphatic dicarboxylic acid has not less than 9 carbon atoms and wherein said glycol component is a glycol represented by the formula, $$HO(CH_2)_nOH$$

wherein $n$ is a number selected from 2 to 10.

5. An electrothermally deformable levelling pad as claimed in claim 1, wherein said acid component contain terephthalic acid in an amount of not less than 60 mole percent and the aliphatic dicarboxylic acid having not less than 9 carbon atoms and wherein said glycol component is a compound selected from the group consisting of ethylene glycol, trimethylene glycol and tetramethylene glycol, the mole ratio of said aromatic carboxylic acid residue relative to said aliphatic dicarboxylic acid residue having not less than 9 carbon atoms being within the range of 60/40 to 95/5.

6. An electrothermally deformable levelling pad as claimed in claim 1, wherein each of said holes extends completely through the thickness of said thermoplastic resin.

* * * * *